United States Patent [19]

Keith

[11] 3,986,808

[45] Oct. 19, 1976

[54] APPARATUS FOR DEFORMING THERMOPLASTIC SHEET

[75] Inventor: Donald George Keith, Mount Eliza, Australia

[73] Assignee: ICI Australia Limited, Australia

[22] Filed: Apr. 14, 1975

[21] Appl. No.: 568,133

[30] Foreign Application Priority Data
May 10, 1974 Australia.............................. 7528/74

[52] U.S. Cl. ............................................... 425/370
[51] Int. Cl.² ........................................ B29C 17/00
[58] Field of Search.................... 425/369, 370, 371

[56] References Cited
UNITED STATES PATENTS

| | | | |
|---|---|---|---|
| 1,257,472 | 2/1918 | Ford .................................... | 425/370 |
| 1,263,577 | 4/1918 | Lochman............................ | 425/370 |
| 1,293,295 | 2/1919 | Amidon .............................. | 425/370 |
| 2,514,801 | 7/1950 | Sapp .................................... | 425/370 |
| 2,663,351 | 12/1953 | Osborne et al. .................... | 425/370 |
| 3,792,952 | 2/1974 | Hamon .......................... | 425/370 X |
| 3,871,809 | 3/1975 | Williams............................. | 425/370 |
| 3,888,618 | 6/1975 | Jones .............................. | 425/370 X |
| R13,583 | 6/1913 | Thiebaut............................. | 425/370 |

Primary Examiner—J. Howard Flint, Jr.
Attorney, Agent, or Firm—Cushman, Darby & Cushman

[57] ABSTRACT

Apparatus for deforming a sheet of thermoplastic material by sequentially pressing against one face of the hot sheet of material the cold tips of projections set in and extending normally from a first series of separately moveable combs and sequentially pressing against the second face of the material the cold tips of projections set in and extending normally from a second series of separately moveable combs so that the projections in the first series of combs interpenetrate with the projections on the second series of combs in such a manner that the projections of the first series are spaced from the projections of the second series by a distance greater than the thickness of the sheet; the interpenetrated projections are substantially parallel during the act of interpenetration; and the combs of any one series form a block pressing against the sheet of thermoplastic material, wherein the block so formed by the combs of any one series has two straight parallel sides, parallel with the sides of the thermoplastic sheet and has non-linear projections running across the block having a median normal to the parallel sides of the block said projections characterized in that an envelope around any one projection overlaps with the envelope around an adjacent projection; the combs each contain one or more complete projections; and wherein the interpenetrated combs are moved along at the speed of the sheet until the sheet is set and the combs are then removed and recycled.

1 Claim, 5 Drawing Figures

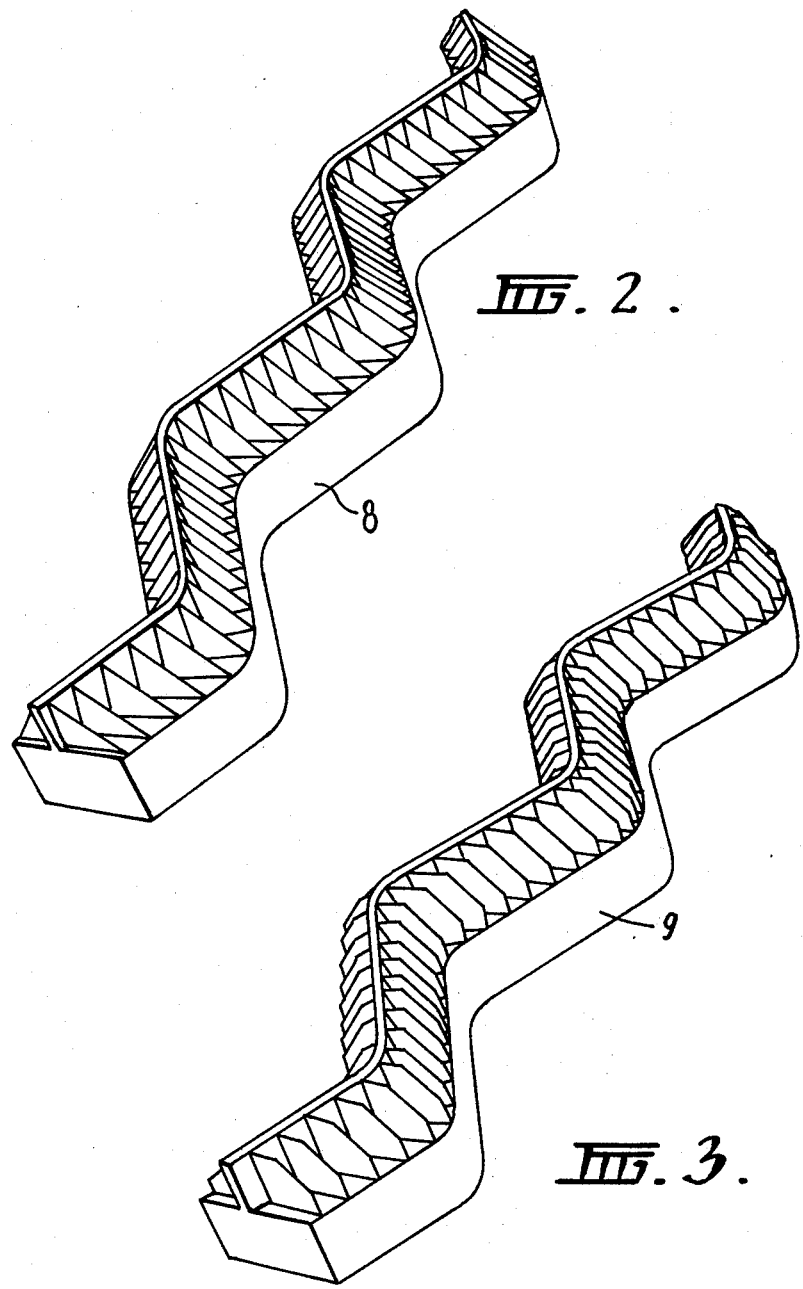

APPARATUS FOR DEFORMING THERMOPLASTIC SHEET

This invention relates to an apparatus for deforming thermoplastic sheet in particular to an apparatus for forming bi-corrugated sheets.

Bi-corrugated thermoplastic sheets are normally made by vacuum, drape or blow forming in a batch process.

In apparatus for press stretching or stretching by differential fluid pressure (vacuum, drape, blow forming) a flat sheet is given increased area (therefore stretched) by making it concave. Such increase of area is achieved by generating concavity predominantly above or below the original sheet plane which causes powerful resultant tensions both along and across the original sheet plane, and the sheet can only be operated on if its original boundaries are constrained unchanged by powerful clamping means. The material under the clamping ring is usually waste, up to 25% of the product area, and a trimming operation is required.

We have now developed an apparatus for forming thermoplastic continuously in which the thermoplastic sheet does not require clamp and hence the product may be used without trimming.

The nature of the thermoplastic sheet is not narrowly critical and any of the common thermoplastic materials may be used. Typical thermoplastic materials are for example, vinyl polymers such as PVC homopolymer, copolymers of vinyl chloride and vinyl acetate polyvinylidene chloride copolymers and copolymers of ethylene and vinyl alcohol; polyolefins such as low density polyethylene, high density polyethylene, polypropylene, high impact polystyrene and poly(4-methylpentene-1); polyesters such as poly-(ethyleneterephthalate) and poly[1,(1-bis(methylene)-cyclohexaneterephthalate(1,2-cis:trans)]; polyamides such as nylon 66, 610, 6 and 11; inorganic glass such as soda or borosilicate glass; and thermoplastic rubbers.

Vinyl polymers are of particular importance as the resulting shapings may be glued together to form composite structures such as tower packings very easily. Preferably the vinyl polymer has a range of at least 20° C between the softening and decomposition points.

The shape of the projections on each block is not narrowly critical as long as the projections are non-linear in the plane of the block and as long as the projections cannot be separated one from another by means of a straight line not passing through a projection. Typical projections used in our invention are sine shaped curves or zigzags but other more complicated non-linear shapes are not excluded. The projections may be either sharp ended or blunt ended and may extend continuously across the width of the comb or may extend only partially across the comb. The projections may also optionally have side portions extending from the main projections. All parts of the projections need not be set the same height above the comb surface but the height may be varied so as to give fine structure to the product. The projections on one series of combs may be of different shape to the projections on the second series of combs.

Suitable projections are, for example, knife blades set sharp end outwards from the comb or may be strips or bars of material conveniently metal optionally fitted to a suitable support and thence fitted into the comb.

The depth of draw is not critical and may range from shallow to extremely deep drawn articles in which the distance between adjacent projections is less than half the height of the projections. Using the same combs it is possible to produce sheets having different profiles merely by altering the depth of interpenetration of the combs.

For the manufacture of deep drawn sheet we prefer that the thermoplastic sheet is melt spinnable and that the projections are sharp ended.

For the manufacture of shallow drawn sheet the thermoplastic sheet need not be melt spinnable in which case the projections are preferably blunt ended for example, metal bars.

The crux of the present invention is the realization that a formed sheet may be formed continuously and without side clamp by a process in which the sheet is formed by interaction of projections in which the moving instant of interaction between the projections on the combs occurs at a standing front whose locus is a non-rectilinear line.

It is clear that in such a process the convexity/concavity is connective across the machine direction where single sinuous valleys pass entirely across the article. It would appear that as in vacuum forming the side to side stretch would require heavy clamping means to resist side tension.

We have found that such side tension either does not arise at all or in process terms is trivial and requires no clamp. Surprisingly, using zig zag projections the resultant tensions arising from each slanting part of the sinuous ridge are equal and opposite. Hence, the process works continuously and clamplessly and with a non-linear standing front.

In addition, it is by no means obvious that a thermoplastic sheet could be satisfactorily formed using combs in which the forming is carried out on a non-linear front as it would be expected that the forming by the first comb would affect the forming by the second comb.

So that the invention may be more clearly defined a preferred embodiment useful for the manufacture of "Flocor" will now be described with reference to the diagrams in which FIG. 1 shows a general schematic view of an apparatus for continuous operation of our process;

FIG. 2 shows a perspective view of a comb of the first series of combs;

FIG. 3 shows a perspective view of a comb of the second series of combs;

Figure 5:
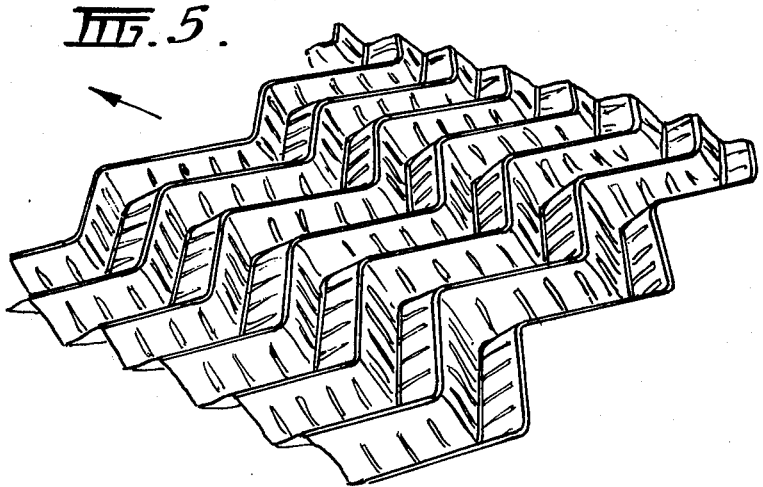
FIG. 5 is a perspective view of the product formed using the apparatus.

The product (FIG. 5) formed in the preferred embodiment of our invention has hitherto only been prepared using accurately made dies in a conventional moulding process. Using the combs shown in FIGS. 2 and 3 it is possible to mimic the moulded product using combs which do not have any inter-touching parts and therefore need not be made to the high degree of accuracy of the conventional process. Our continuous process has the additional advantage that there is no edge loss due to clamp.

The product is Flocor and is used in effluent treating as a packaging for effluent towers (Flocor is a Registered Trade Mark for ICI for an effluent tower packing).

Figure 1:
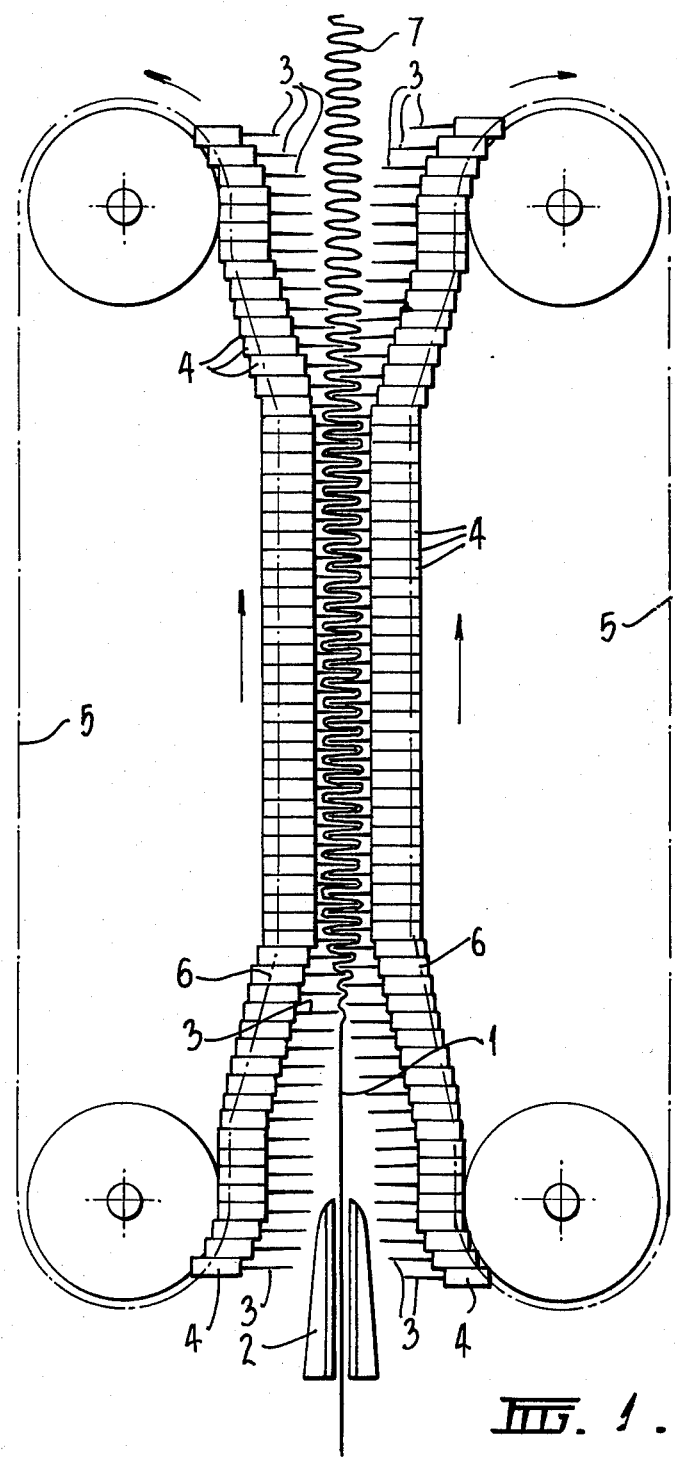

In FIG. 1 thermoplastic film 1 is extruded from the extruder dye 2 and fed between two series of combs 4. The nature of the thermoplastic film is not critical but for Flocor we prefer that the film is PVC homopolymer or PVC copolymer feedstock. The film need not be directly extruded but may be fed into the machine via a reheat line. The individual rows of projections 3 are mounted on combs 4 which are separately slideable in a direction at right angles to the plane of two co-operative belts or link-chain circuits 5 and the interdigitation of the combs is effected by camming 6 as is the withdrawal of the combs after the formed sheet 7 has cooled. Alternatively the combs after withdrawal may be returned to the head of the machine by means of a quick return mechanism. Suitable will be obvious to those skilled in the art.

The cooled product is preferably cut into individual sheets by an in-line process. Suitable means are known to those skilled in the art and include "flying saws" and use of a retractable knife cutting in the material while it is still clamped between the combs.

In the formation of highly shaped articles such as Flocor we prefer that the combs 4 are not identical in each series. FIG. 2 shows a comb 8 of the first series and FIG. 3 shows a comb 9 of the second series for making Flocor. A more detailed description of the combs is given in Example 1 hereinbelow.

Figure 4:
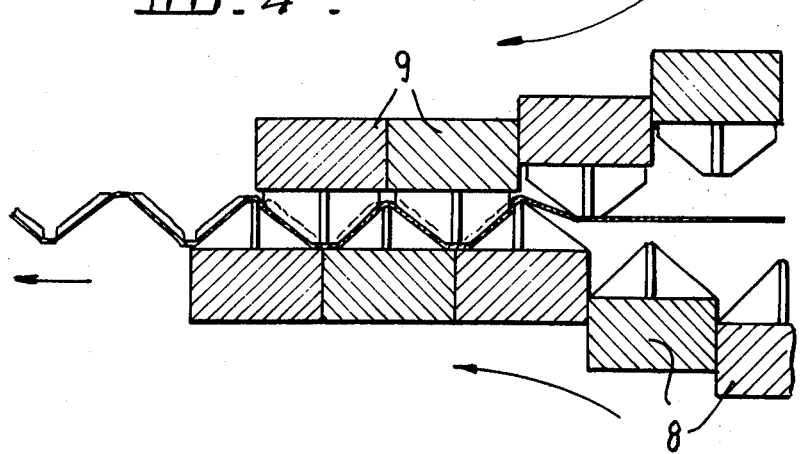
FIG. 4 is a schematic view of the preferred apparatus of our invention.

FIG. 4 depicts schematically the way in which the combs 8 of the first series are alternatively interdigitated with the combs 9 of the second series.

The combs and the projections of the combs may be made of any suitable material such as, for example, metal ceramic, glass, wood or certain rigid plastic materials. The suitability of any particular material depends upon the conditions required to form the plastic sheet being used as feed stock for our process.

The invention will now be illustrated by, but by no means limited to, the following examples.

EXAMPLE 1

The combs 8, 9 were produced as follows. A strong steel strip was bent in zig zag or sinuous form and affixed edgewise to a strong wooden base. At frequent intervals fins or fillets of thin sheet metal were affixed so that each pair of fins formed a counter ridge running from the crest of the sinuous steel strip to the surface of the wooden base. The wooden base was machined to the form defined by the set of fillets. In each lower comb 8 the fillets were triangular, in each upper comb 9 the fillets were essentially triangular with an extension beyond the hypotenuse, these extensions being intended to interdigitate with the fillet edges of the opposite modules, drawing secondary corrugations in the valley wall of the shapings to enhance the stiffness.

EXAMPLE 2

Combs such as those described in Example 1 were mounted in two sets of combs in a travelling press comprising recirculating means 5 conveying the combs in such a way that during the active portion of the moulding cycle the upper and lower combs while being maintained in precise register and always parallel to the horizontal plane are slowly interdigitated, and interdigitation is maintained until the moulded sheet has cooled, then the combs are recirculated optionally by a quick return device. To this continuous machine plastic sheet at thermoforming temperature was supplied either by extrusion from a slit die (low density polythene) or by the reheating of sheet coilstock by controlled radiant heating (PVC copolymer).

We found that under carefully controlled conditions the continuously shaped sheet was obtained from hot precursor sheet of equal width and no trim or edge clamp was required.

EXAMPLE 3

The machine described in Example 2 was employed using various plastics. Rigid PVC copolymer sheet (12% vinyl acetate/vinyl chloride copolymer) was reheated in such a way that sheet entered the continuous machine at a temperature of 165° C, sheet input being at a linear speed of 14 feet/min. The closure or interdigitation of combs was cammed 6 to occur at a rate vertical to the machine plane of 2 feet/min. Excellent product with well distributed stretch, good hot stability and good compressive strength was obtained continuously. Both the "hill" and "valley" of the shaped material were identical in materials thickness, materials distribution, and strength and no clamp or edge trim was required. These shapings, continuously produced, were found to be 20% stronger in compression than similarly designed vacuum formed panels, and represented a great economy in materials, as the batch vacuum formed panels required a clamped area 25% of the useful area, that clamped part being lost as trim.

The same machine was installed before a screw extruder supplying a slit dye, and used to continuously mould polyethylene of both low and high density types, polypropylene and high impact styrene resins. We found that except for slight alterations to input temperature and rate of machine closure excellent results were obtained with all these materials and in particular the materials distribution with polyolefines was excellent whereas these materials respond especially poorly to vacuum forming.

I claim:

1. Apparatus for deforming a continuous sheet of thermoplastic material into a bi-corrugated sheet, said apparatus comprising two spaced-apart endless conveyors having opposed runs defining a space therebetween; a series of discrete combs carried by each conveyor so that upon movement of said conveyors each series moves along said space in opposed relationship to the other series, each of said combs having projections extending therefrom so that in said space the projections on one series of combs are parallel to and can interpenetrate with the projections on the second series of combs, and each of said combs being mounted on its respective conveyor for independent movement normal to said respective conveyor; the combs of any one series forming a block for pressing against a sheet of thermoplastic material, the block so formed by the combs of any one series having two straight parallel sides, parallel with the sides of the thermoplastic sheet and having non-linear projections running across the block having a median normal to the parallel sides of the block said projections characterized in that an envelope around any one projection overlaps with the envelope around and adjacent projection; means for moving each comb normal to its respective conveyor and toward the other conveyor as said comb enters said space so that the projections on opposed combs interpenetrate with each other, the projections on opposed interpenetrating combs in said space being parallel and being spaced apart from each other by a distance greater than the thickness of the thermoplastic sheet; means for moving each comb normal to its respective conveyor and away from the other conveyor as said comb leaves said space; and means for feeding a continuous sheet of thermoplastic material into said space in the direction of movement of said combs along said space.

* * * * *